United States Patent [19]

Terai et al.

[11] Patent Number: 5,381,189
[45] Date of Patent: Jan. 10, 1995

[54] PROJECTOR IN A PROJECTION TELEVISION

[75] Inventors: Takashi Terai; Takayuki Yoshioka; Hideki Yamamoto, all of Tokyo, Japan

[73] Assignee: Pioneer Electronic Corporation, Tokyo, Japan

[21] Appl. No.: 141,357

[22] Filed: Oct. 28, 1993

Related U.S. Application Data

[63] Continuation of Ser. No. 836,379, Feb. 18, 1992.

[30] Foreign Application Priority Data

Jul. 18, 1991 [JP] Japan ................. 3-178474

[51] Int. Cl.⁶ ............................................. H04N 5/74
[52] U.S. Cl. ................................... 348/776; 348/779; 348/785
[58] Field of Search ............... 348/776, 778, 779, 780, 348/781, 785, 787, 789, 805, 806, 825, 826, 827; H04N 5/74, 9/31; 313/474, 478; 353/101

[56] References Cited

U.S. PATENT DOCUMENTS 5,045,930  9/1991  Hasegawa ..................... 358/231
5,298,984  3/1994  Numata ........................ 348/778

FOREIGN PATENT DOCUMENTS 0101077   4/1989  Japan .......................... H04N 5/74
0112879   5/1989  Japan .......................... H04N 5/74
0109884   5/1991  Japan .......................... H04N 5/74
4020185   1/1992  Japan .......................... H04N 5/74
5167962   7/1993  Japan .......................... H04N 5/74
5167963   7/1993  Japan .......................... H04N 5/74
5227503   9/1993  Japan .......................... H04N 5/74
5268554  10/1993  Japan .......................... H04N 5/74

Primary Examiner—James J. Groody
Assistant Examiner—Michael H. Lee
Attorney, Agent, or Firm—Keck, Mahin & Cate

[57] ABSTRACT

A liquid cooling type projector is provided with greater flexibility to meet different screen sizes of a projection television and, thus, contributes to the reduction of production cost. The projector has a cylindrical frame containing a projection lens unit mounted by a liquid-tight member thereto and coupled at a rear end to a CRT in liquid-tight arrangement such that a liquid-sealing space is established between the projection lens and the CRT. In particular, the projection lens unit is arranged so as to be movable with respect to the frame along its optical axis. Also, the liquid-tight member is arranged to maintain the liquid-tight condition regardless of the position of the projection lens unit relative to the frame. Thus, the projection lens unit can arbitrarily be displaced towards and away from the CRT, increasing a focusing range. Accordingly, the projector will successfully be matched to different sizes of projection screens contributing to the reduction of the production cost of projection televisions.

3 Claims, 7 Drawing Sheets

PROJECTOR IN A PROJECTION TELEVISION

This is a continuation of application Ser. No. 07/836,379, filed Feb. 18, 1992.

BACKGROUND OF THE INVENTION

1. Field of the Invention

The present invention relates to a projection television and, more particularly, to a projector of cathode ray tube (referred to as CRT hereinafter) of a projection type.

2. Description of the Prior Art

It is well known that a common projection television contains three, red, green, and blue color, CRTs from which an enlarged image is projected through a projection lens onto a screen. There are available two different types: a front projection type, shown in FIG. 1, and rear projection type, shown in FIG. 2, in which only one of the three CRTs is illustrated. A front projection television shown in FIG. 1 projects an image produced by the CRTs 51 through a projection lens unit 52 onto a reflective screen 53 so that a viewer can perceive a reflected light of the image. Similarly, a rear projection television shown in FIG. 2 projects an image through a projection lens unit 52 onto a transmitting screen 54. In the rear projection television, there is provided at least one reflective mirror 55 between the projection lens unit 52 and the screen 54.

In particular, the distance between the CRT 51 and the projection lens unit 52 of each projection television can be varied with ease thus compensating distortion on a projected image resulting from a change in the screen size. However, the distance between the CRT 51 and the projection lens unit 52 provides an air space 55 thus offering the following drawback.

In such an air coupling system, there are produced at least three interfaces between the air, the projection lens unit 52, and the CRT 51 due to differences in the refractive index. Each interface reflects a few percent of the beam of light emitted from the CRT 51 back to the phosphor surface of the same, whereby contrast in a projected image will be declined considerably. Also, the CRT 51 itself remains less effective in heat dissipation thus failing to increase luminance and ensuring low operational reliability and short life.

For eliminating the foregoing drawback, a modified projector assembly has been proposed as shown in FIG. 3.

The modified projector assembly shown in FIG. 3 comprises a CRT 57 for producing an image to be projected, a projection lens unit which is arranged at a distance from the CRT 57 for projecting the image and consisted mainly of e.g. four aspherical plastic lenses 58 to 61 and a glass power lens 62, a cylindrical frame 64 carrying therein the projection lens unit and coupled by an O-ring 63 to a face plate of the CRT 57 in liquid-tight arrangement, an O-ring 65 interposed between the rear end plastic lens 61 and the cylindrical frame 64 thus to provide a liquid-sealing space between the rear end lens 61 and the CRT 57 and acting as a liquid-tight means, and a cooling liquid 66 filled in the liquid-sealing space.

During operation of the above liquid cooling type projector assembly, the CRT 57 can efficiently be cooled down with the cooling liquid 66. Accordingly, luminance in the projected image will be enhanced and, also, the operational reliability and life of the CRT 57 will be increased. When the cooling liquid 66 is adapted to be equal in the refractive index to the plastic lens 61, the reflectivity of transmitting light at the interface therebetween will be declined and thus, higher contrast in the projected image will be ensured.

Such projection televisions are now available with a variety of screen sizes which correspond to different room sizes and a number of viewers to be expected. The liquid cooling type projector assemblies of corresponding sizes are hence installed in the different screen-size projection televisions. In general, the liquid cooling type projector assembly provides a narrow focusing range for image production determined strictly by the projection lens unit and will thus be applicable for limited use. Accordingly, each projection television of a given screen size has to be equipped with its corresponding size of the projector assembly, which will be disadvantageous in the reduction of production cost.

SUMMARY OF THE INVENTION

It is an object of the present invention, for elimination of the foregoing disadvantage, to provide an improved projector which has more flexibility for use with different sizes of the display screen of a projection television and, thus, contributes to cost reduction in production of the projection televisions.

The projector according to the present invention comprises a CRT for producing an image to be projected, a projection lens unit arranged at a distance from the CRT for projecting the image onto a screen, a cylindrical frame coupled at rear end to the CRT in liquid-tight fashion and containing the projection lens unit therein, a liquid-tight means interposed between the projection lens unit and the frame to provide a liquid-sealing space between the same, and a cooling liquid filled in the liquid-sealing space. In particular, the projection lens unit is arranged to move relative to the frame along its optical axis and the liquid-tight means is arranged to maintain the liquid-tight condition regardless of the position of the projection lens unit relative to the frame.

Accordingly, the projection lens unit of the projector can arbitrarily be displaced along its optical axis to and from the CRT.

DETAILED DESCRIPTION OF A PREFERRED EMBODIMENT

One embodiment of the present invention will be described in the form of a projector referring to the accompanying drawings.

Figure 1:
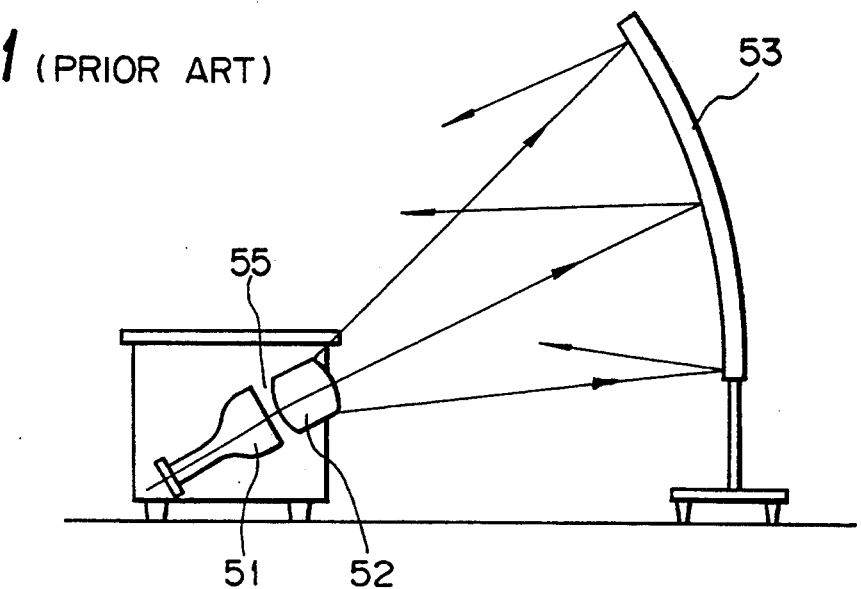
FIG. 1 is a longitudinal cross sectional view of a front type projection television equipped with prior art projectors.
Figure 2:
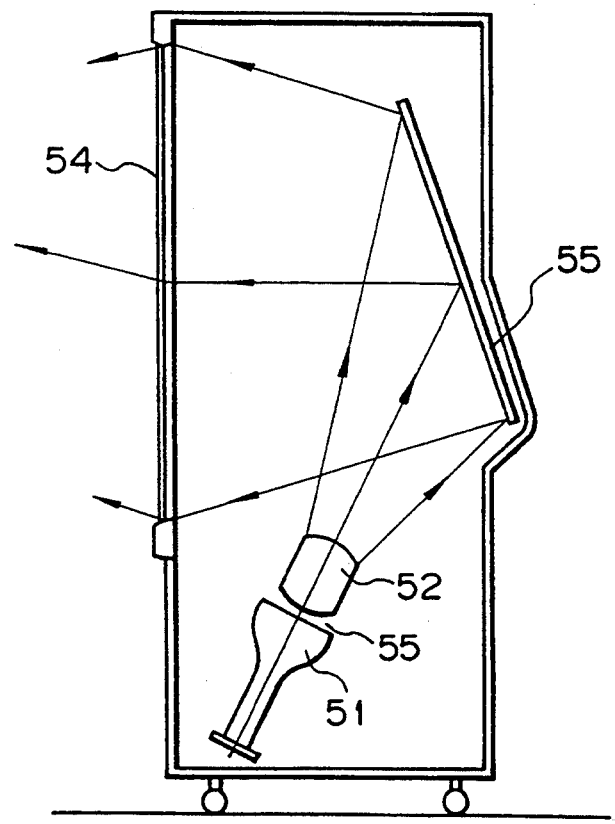
FIG. 2 is a longitudinal cross sectional view of a rear type projection television equipped with prior art projectors.
Figure 3:
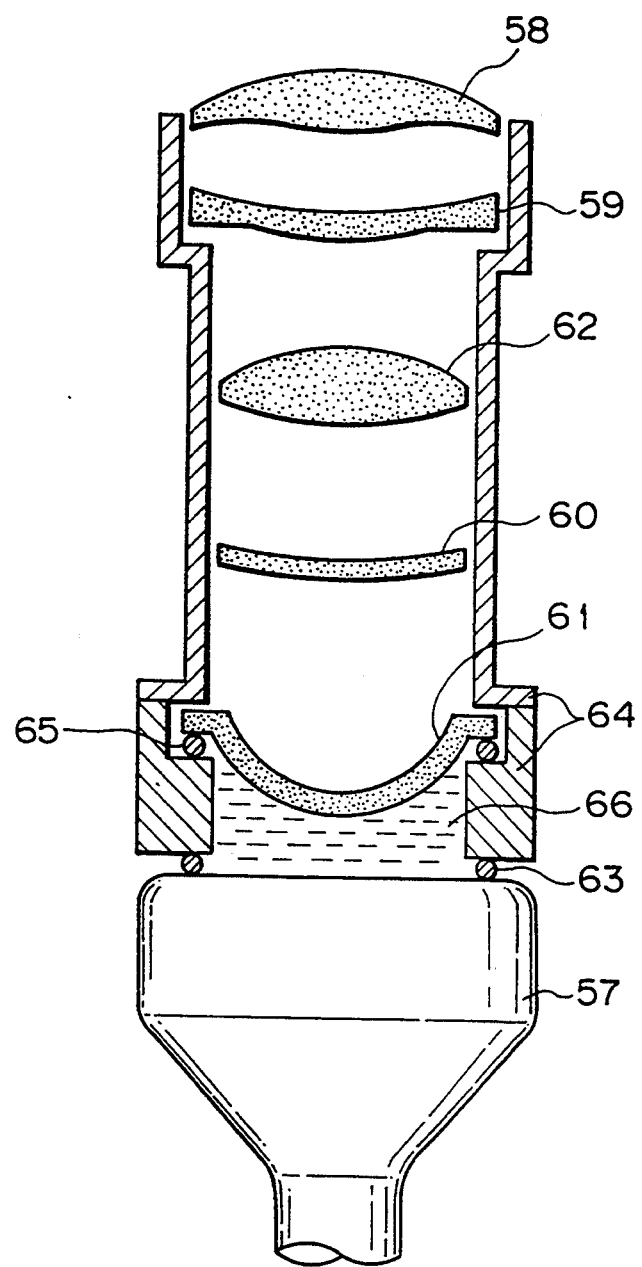
FIG. 3 is a partially cross sectional plan view showing a known projector.
Figure 4:
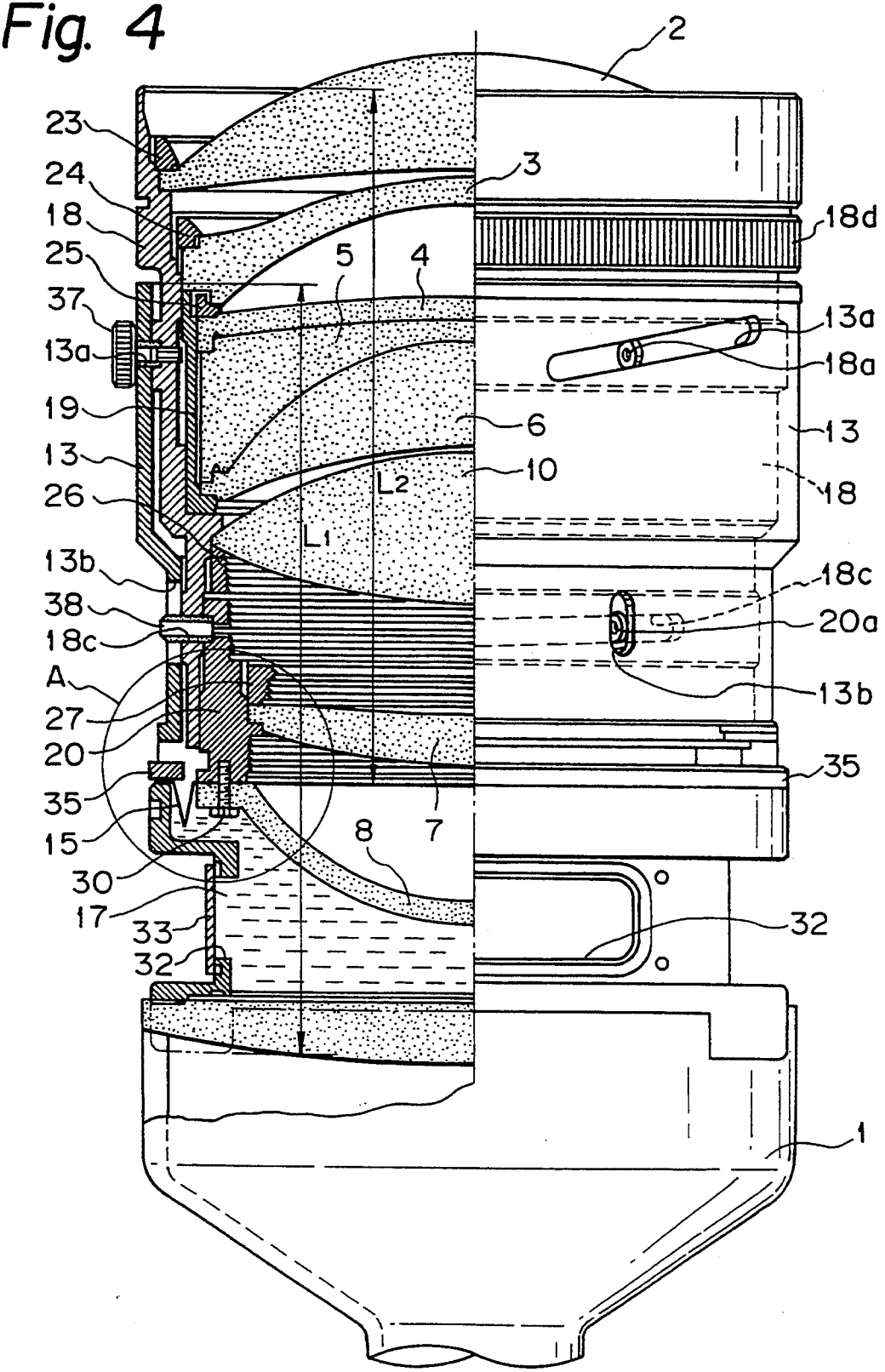
FIG. 4 is a partially cross sectional plan view of an improved projector showing one embodiment of the present invention.

As shown in FIG. 4, the projector of the present invention comprises a CRT 1 for producing an image to be projected, a projection lens unit which is arranged at a distance from a face plate of the CRT 1 for projecting the image produced by the CRT 1 and consisted mainly of e.g. seven aspherical lenses 2 to 8 of glass or plastic material and a power projection lens 10, a cylindrical frame 13 carrying the lens unit therein and coupled at rear end to the face plate of the CRT 1 in liquid-tight fashion, an annular elastic member 15 interposed between the frame 13 and the surface curvature collecting lens 8 (referred to as a flattener lens hereinafter) disposed at the rear end of the projection lens unit so as to provide a liquid-sealing space between the flattener lens 8 and the face plate of the CRT 1 and, thus, acting as a liquid-tight means, and a cooling liquid 17 filled in the liquid-sealing space.

Also, an inner tube 18 of cylindrical shape is inserted in the frame 13 so that it can slide along and rotate about its center axis. The projection lens unit except the flattener lens 8 is fixedly mounted by two spacers 19, 20 and five rings 23 to 27 to the inner wall of the inner tube 18. The rear-end flattener lens 8 is coupled to one side end of the spacer 20 using bolts 30. Accordingly, the projection lens unit can be moved along its optical axis with respect to the frame 13. As shown in FIG. 4, the entire length of the frame 13 is denoted by L1 and of the inner tube 18 is denoted by L2. The frame 13 has an opening 32 provided therein for communicating with the liquid-sealing space filled with the cooling liquid 17. In common, the opening 32 remains closed in liquid-tight fashion with a pressure adjusting rubber packing 33 fastened by e.g. bolts to the frame 13.

Figure 5:
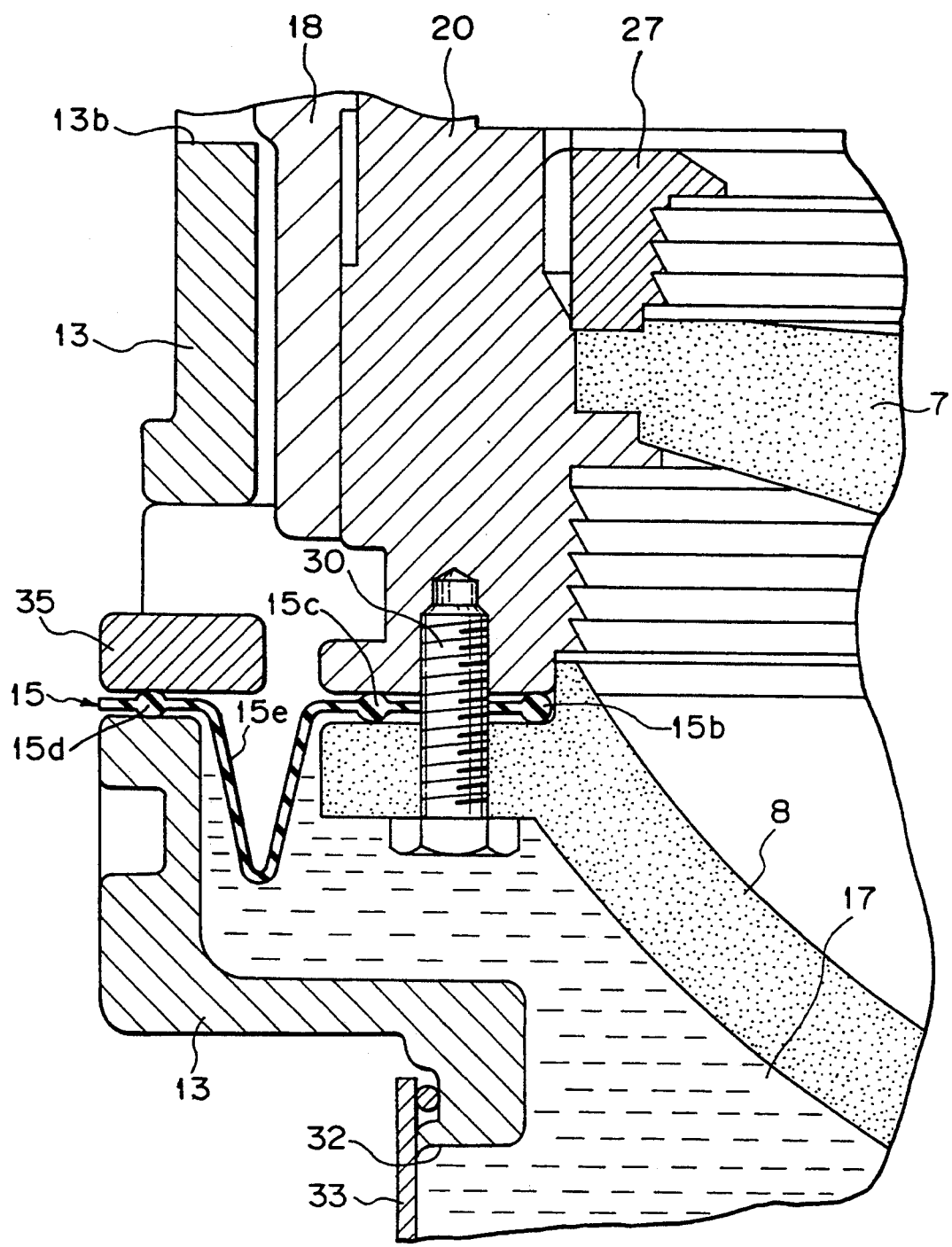
FIG. 5 is an enlarged view showing the region denoted by the letter A in FIG. 4.
Figure 6:
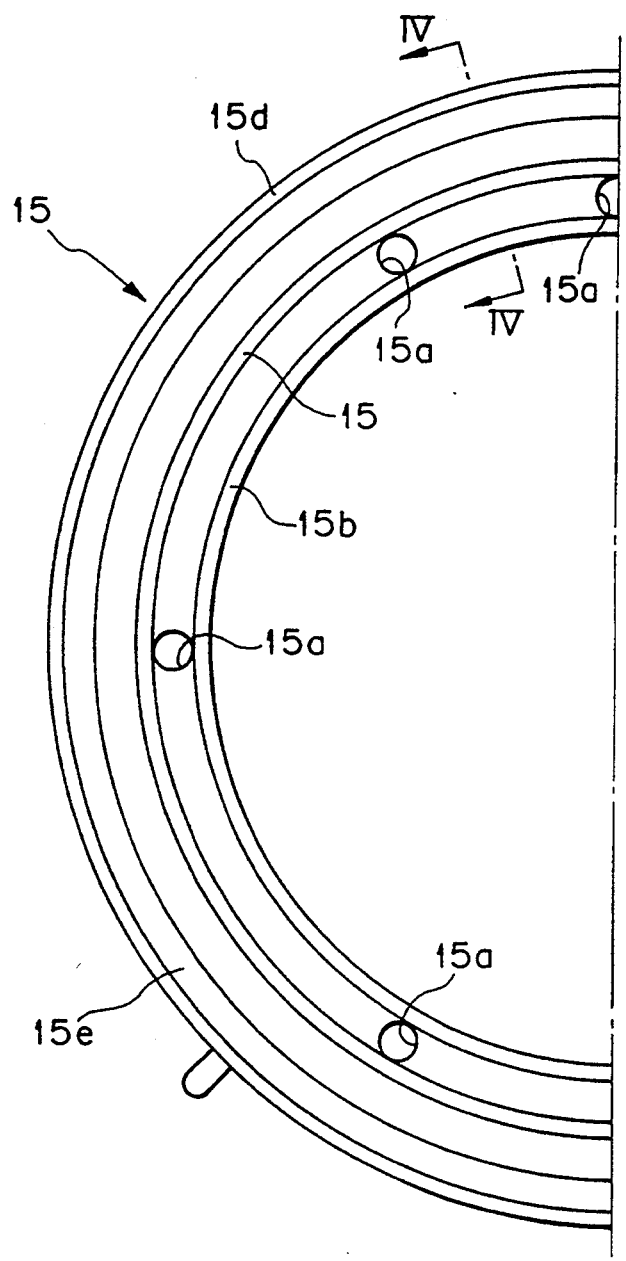
FIG. 6 is a plan view of an annular elastic member installed in the projector illustrated in FIGS. 4 and 5.
Figure 7:
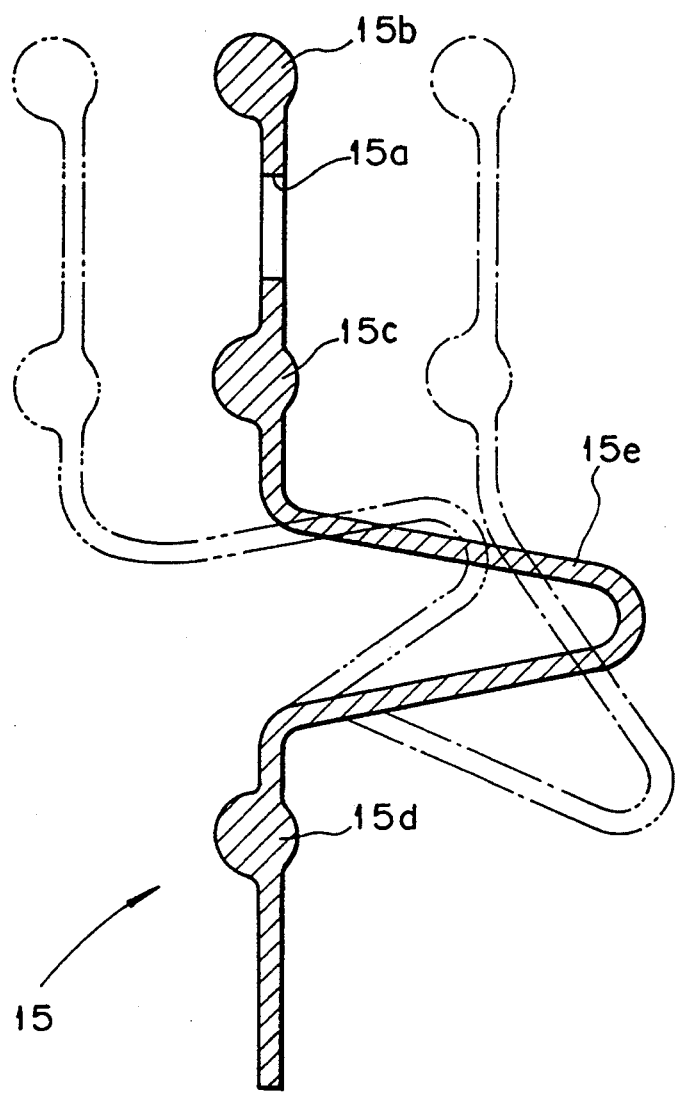
FIG. 7 is a cross sectional view taken along the line IV—IV of FIG. 6.

The annular elastic member 15 interposed between the flattener lens 8 and the frame 13 is preferably made of rubber or synthetic resin material and shaped into a membrane form as best shown in FIG. 5. The annular elastic member 15 is coupled at inner edge to the flattener lens 8 and at outer edge to the frame 13. In addition, the annular elastic member 15 has a plurality, e.g. seven, of round slots 15a arranged therein on a concentric circle along the inner edge for acceptance of the spacer retaining bolts 30, as shown in FIGS. 6 and 7. The ring of the round slots 15a is also defined at an inner side by an annular rib 15b and at an outer side by an annular rib 15c so that the annular elastic member 15 is securely held between the spacer 20 and the flattener lens 8 by means of the retaining force of the bolts 30. Also, the annular elastic member 15 has a further annular rib 15d arranged along the outer edge thereof. The annular rib 15d of the annular elastic member 15 is pressed down against the frame 13 by an annular pressing plate 35 which is fastened to the frame 13 by unshown tightening means.

More particularly, the annular elastic member 15 has an intermediate portion 15e thereof between the inner and outer edges which has a wave shape in cross section, which is designated along a plane extending across the center of the annular elastic member 15, so that it can provide greater flexibility for movement, as shown in FIGS. 5 and 6. Accordingly, the annular elastic member 15 enables the liquid-tight condition to be maintained regardless of the axial position of the lens unit carrying inner tube 18 relative to the frame 13.

As shown in FIG. 4, the frame 13 has a helical slot opening 13a provided adjacent to the front end thereof. A retainer screw 37 is mounted through the slot opening 13a to a thread hole 18a of the inner tube 18 so that its under-head portion can move along the slot opening 13a. The under-head portion of the retainer screw 37 is coated with a lubricant, e.g. grease oil, for smooth movement of the retainer screw 37 throughout the slot opening 13a. More particularly, the retainer screw 37 is screwed into a thread hole 18a of the inner tube 18.

The frame 13 also has a linear slot opening 13b arranged in rear of the helical slot opening 13a and extending axially of the frame 13. The inner tube 18 has a slot opening 18c extending circumferentially at an angle to the slot opening 13b. A stud bolt 38 is screwed across the two slot openings 13b and 18c into a thread hole 20a of the spacer 20 so that it can move in the two slot openings 13b and 18c. The stud bolt 38 is coated at outer surfaces with a coating of e.g. resin material (represented by no number) for smooth movement throughout the two slot openings 13b and 18c. Also, the spacer 20 is arranged movable axially of the inner tube 18 and rotatable about the center axis of the same.

Figure 8:
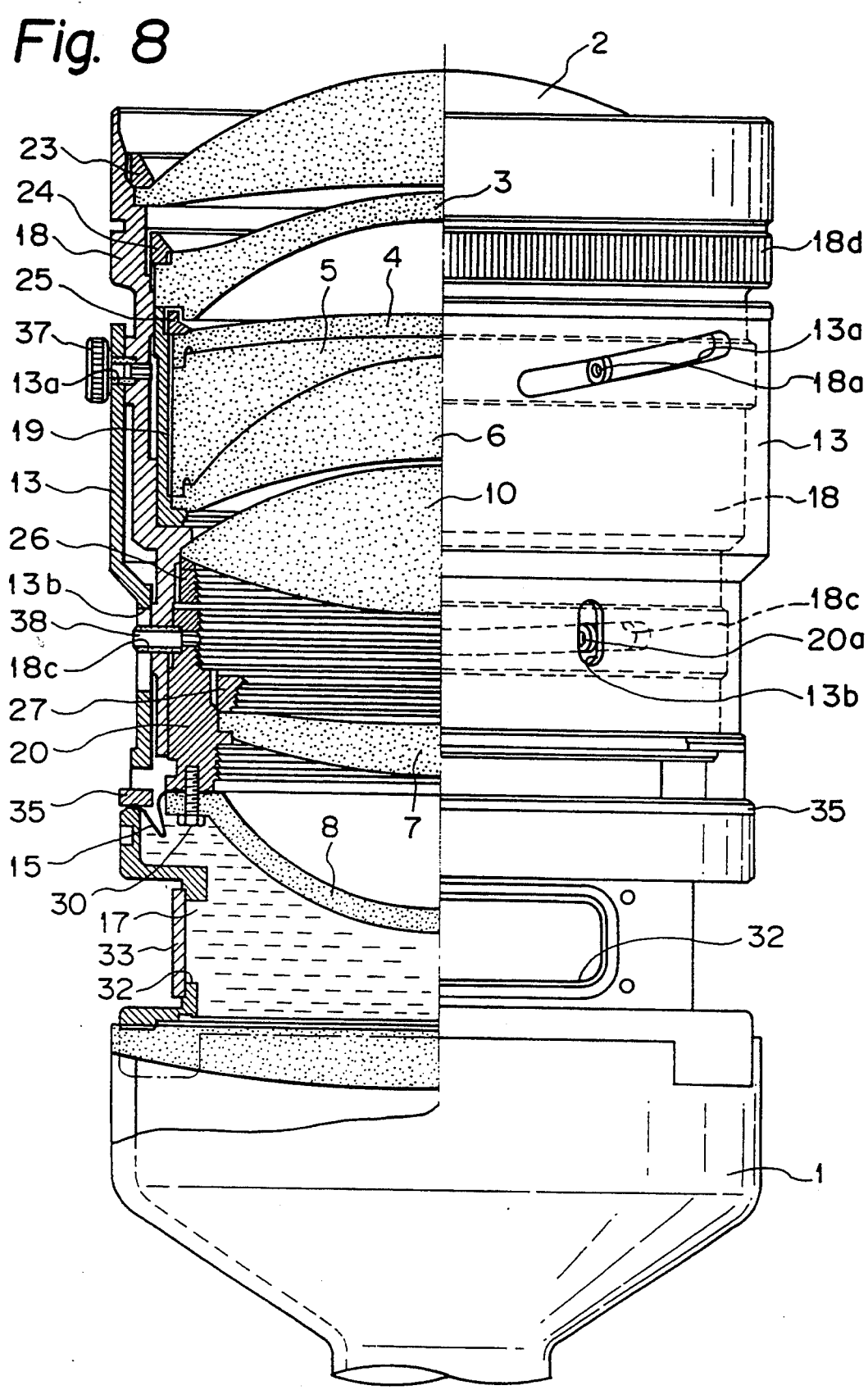
FIG. 8 is an explanatory view showing an action of the projector illustrated in FIG. 4.

Accordingly, the inner tube 18 of the projector can be displaced away from the CRT 1, as shown in FIG. 8, by rotating it about the CRT 1 and frame 13 with its knurled portion 18d being gripped by hand while keeping the retainer screw 37 loosened. At the time, the annular elastic member 15 becomes stressed and shifted from its original position denoted by the real line of FIG. 7 to another position denoted by the two-dot chain line while the liquid-tight condition is kept maintained. Equally, the inner tube 18 can be displaced towards the CRT 1 when rotating in the reverse direction and thus, the annular elastic member 15 becomes shifted to a position denoted by the one-dot chain line of FIG. 7 while the liquid-tight condition is maintained. More particularly, the projection lens unit carried in the inner tube 18 can be moved along its optical axis to and from the CRT 1. After positional adjustment of the projection lens unit, the inner tube 18 is refastened to the frame 13 using the retainer screw 37.

As set forth above, the projector of the present invention has a cylindrical frame containing a projection lens unit mounted by a liquid-tight means thereto and coupled at rear end to a CRT in liquid-tight fashion such that a liquid-sealing space is provided between the projection lens and the CRT. The liquid-sealing space is filled with a cooling liquid medium. In particular, the projection lens unit is arranged movable with respect to the frame along its optical axis. Also, the liquid-tight means is arranged to maintain the liquid-tight condition regardless of the position of the projection lens unit relative to the frame.

In practice, the projection lens unit can arbitrarily be displaced along its optical axis to and from the CRT thus increasing a focusing range and corresponding to different sizes of a projection screen. Accordingly, the projector of the present invention will successfully be employed in different screen-size projection televisions contributing to the reduction of the production cost.

What is claimed is:

1. A projector comprising:
   a projection picture tube for producing an image to be projected;

a projection lens unit, arranged at a distance from the projection picture tube, for projecting the image onto a screen;

a cylindrical frame coupled at a rear end to the projection picture tube in liquid-tight fashion and receiving the projection lens unit therein;

a movable inner member to which at least part of the projection lens unit is mounted, including a rear-end lens of the projection unit;

a liquid-sealing means, interposed between and sealingly coupling the inner member and the frame, for sealing off a liquid-sealing space formed between the projection picture tube, the cylindrical frame and the rear-end lens of the projection lens unit and providing a liquid-tight condition;

a cooling liquid filled in the liquid-sealing space; and retaining means for retaining said inner member in said frame and displacing said inner member toward and away from said projection picture tube to move said inner member relative to the frame along its optical axis;

said liquid-sealing means maintaining the liquid-tight condition regardless of the position of the inner member relative to the frame.

2. A projector according to claim 1, wherein the liquid-sealing means is an annular elastic member coupled at inner and outer edges to said inner member and the frame, respectively, and having a flexible intermediate portion thereof between the inner and outer edges.

3. A projector according to claim 2, wherein the annular elastic member is of membrane form and has a wave shape, in cross section, along a plane which extends across a center axis of the annular elastic member.

* * * * *